US011983185B2

(12) United States Patent
Hill

(10) Patent No.: US 11,983,185 B2
(45) Date of Patent: May 14, 2024

(54) SYSTEMS AND METHODS FOR MACHINE LEARNING-BASED QUERY CONTEXT GENERATION AND QUERY RESPONSE HANDLING

(71) Applicant: Knowbl LLC, Ponte Vedra Beach, FL (US)

(72) Inventor: Parker Hill, Reno, NV (US)

(73) Assignee: Knowbl Inc., Northville, MI (US)

(*) Notice: Subject to any disclaimer, the term of this patent is extended or adjusted under 35 U.S.C. 154(b) by 0 days.

(21) Appl. No.: 18/104,763

(22) Filed: Feb. 1, 2023

(65) Prior Publication Data

US 2023/0244678 A1   Aug. 3, 2023

Related U.S. Application Data

(60) Provisional application No. 63/305,366, filed on Feb. 1, 2022.

(51) Int. Cl.
*G06F 16/2457* (2019.01)
*G06N 20/00* (2019.01)

(52) U.S. Cl.
CPC ....... *G06F 16/24578* (2019.01); *G06N 20/00* (2019.01)

(58) Field of Classification Search
CPC .......................... G06F 16/24578; G06N 20/00
USPC ........................................................ 707/748
See application file for complete search history.

(56) References Cited

U.S. PATENT DOCUMENTS

| 11,526,512 | B1* | 12/2022 | Halabi | G06F 40/289 |
| 2009/0171938 | A1* | 7/2009 | Levin | G06F 16/951 |
| | | | | 707/999.005 |
| 2018/0150524 | A1* | 5/2018 | Anger | G06F 16/9535 |
| 2018/0349477 | A1* | 12/2018 | Jaech | G06F 16/3334 |
| 2019/0130285 | A1* | 5/2019 | Snyder | G06Q 30/0641 |
| 2019/0251184 | A1* | 8/2019 | Shan | G06N 3/045 |
| 2020/0380964 | A1* | 12/2020 | Kang | G06F 40/35 |
| 2022/0414169 | A1* | 12/2022 | Biswas | G06N 3/082 |

* cited by examiner

*Primary Examiner* — Hosain T Alam
*Assistant Examiner* — Saba Ahmed
(74) *Attorney, Agent, or Firm* — Padowithz Alce; Alce PLLC

(57) ABSTRACT

A system and method for improving a predictive accuracy of a machine learning-based virtual conversational agent that includes computing an antecedent context nexus based on query embeddings computed for a preceding query input by a user, wherein the antecedent context nexus includes a pairing of a categorial parameter and a sub-categorical parameter derived based on the query embeddings of the preceding query; creating search logic parameters based on the categorical parameter and the sub-categorical parameter of the antecedent context nexus; executing a context nexus-informed search of a corpus of structured data using at least the search logic parameters; extracting a response candidate from the corpus of structured data based on the execution of the context nexus-informed search; constructing a response to the preceding query based on the extracted response candidate; and returning, via a user interface, the response to the preceding query.

20 Claims, 3 Drawing Sheets

200

Computing a Query or Utterance Vector 210

Computing a Context Nexus S220

Routing Query Data S230

Reconciling Context Nexus Parameters S240

Identifying an Optimal Response S250

FIGURE 2

SYSTEMS AND METHODS FOR MACHINE LEARNING-BASED QUERY CONTEXT GENERATION AND QUERY RESPONSE HANDLING

CROSS-REFERENCE TO RELATED APPLICATIONS

This application claims the benefit of U.S. Provisional Application No. 63/305,366, filed 1 Feb. 2022, which is incorporated in its entirety by this reference.

TECHNICAL FIELD

This invention relates generally to the machine learning-based query response generation field, and more specifically to a new and useful systems and methods for implementing unsupervised machine learning models for generating contextual parameters for improved query response identification in the machine learning-based query response generation field.

BACKGROUND

Automated query response and/or query search systems may typically be deployed to enable users to discover answers to various questions. Many of the automated query response and/or search systems are naïve, in operation, and often only use regular expression searching techniques to provide response to queries. A fundamental problem with such automated response systems may be their incapability to deliver useful responses to queries that may be posed in a manner inconsistent with patterns of potential responses in a search space. Accordingly, using regex or similar search techniques, these automated query response systems may fail in providing responses to non-conforming queries.

Additionally, in circumstances in which multiple related queries may be posed by a user in a querying session or the like, the automated query response systems may not be able to identify, much less, maintain a context of the multiple queries to enable a production of best responses to the multiple queries.

Thus, there is a need in the automated query search and response fields to create new and useful systems and methods for implementing machine learning-based context generation and intelligent context-informed query search and response. The embodiments of the present application described herein provide technical solutions that address, at least, the needs described above, as well as the deficiencies of the state of the art.

BRIEF SUMMARY OF THE INVENTION(S)

In one embodiment, a method for improving a predictive accuracy of a machine learning-based virtual conversational agent includes computing an antecedent context nexus based on query embeddings computed for a preceding query input by a user, wherein the antecedent context nexus includes a pairing of a categorial parameter and a sub-categorical parameter derived based on the query embeddings of the preceding query; creating search logic parameters based on the categorical parameter and the sub-categorical parameter of the antecedent context nexus; executing a context nexus-informed search of a corpus of structured data using at least the search logic parameters; extracting a response candidate from the corpus of structured data based on the execution of the context nexus-informed search; constructing a response to the preceding query based on the extracted response candidate; and returning, via a user interface, the response to the preceding query.

In one embodiment, the query embeddings computed for the preceding query comprise sentence embeddings based on a span of a plurality of tokens identified within the preceding query; and computing the antecedent context nexus includes using the sentence embeddings derived for the preceding query to perform a search of an n-dimensional embeddings space comprising a plurality of distinct embedding values for the plurality of distinct categories of the corpus of structured data and a plurality of distinct embedding values for the plurality of distinct sub-categories of the structure corpus of data.

In one embodiment, the categorical parameter comprises word or label embeddings representing a likely top-level category of the preceding query, the sub-categorical parameter comprises word or label embeddings representing a likely sub-level category of the preceding query, and executing the context nexus-informed search of the corpus of structured data includes: searching an n-dimensional space of distinct word or label embeddings for each distinct piece or distinct set of structured data of the corpus of structured data based on computationally mapping the word or label embeddings of the top-level category and the word or label embeddings of the sub-level category to one or more regions of embeddings of the n-dimensional space.

In one embodiment, the method includes computing a follow-on context nexus based on an input of a follow-on query by the user and the antecedent context nexus of the preceding query, wherein computing the follow-on context nexus includes: computing a follow-on categorical parameter for the follow-on query, computing a follow-on sub-categorical parameter for the follow-on query; and converting the antecedent context nexus to the follow-on context nexus by replacing the categorical parameter of the antecedent context nexus with the follow-on categorical parameter of the follow-on context nexus or replacing the sub-categorical parameter of the antecedent context nexus with the follow-on sub-categorical parameter.

In one embodiment, the method includes computing a follow-on categorical parameter and a follow-on sub-categorical parameter based on embeddings computed for a follow-on query that is input by the user; and reconciling the antecedent context nexus with the follow-on categorical parameter and the follow-on sub-categorical parameter for the follow-on query, wherein the reconciliation includes: computing whether to update the categorical parameter of the antecedent context nexus with the follow-on categorical parameter; and computing whether to update the sub-categorical parameter of the antecedent context nexus with the follow-on sub-categorical parameter.

In one embodiment, the reconciliation further includes: computing a categorical fit score for each of the categorical parameter of the antecedent context nexus and the follow-on categorical parameter of the follow-on query, wherein: the categorical fit score of the categorical parameter comprises a dot product between embeddings of the categorical parameter and embeddings of the follow-on query, the categorical fit score of the follow-on categorical parameter comprises a dot product between embeddings of the follow-on categorical parameter and embeddings of the follow-on query, and the reconciliation includes updating the antecedent context nexus by replacing the categorical parameter with the follow-on categorical parameter if the categorical fit score of the follow-on categorical parameter is greater than the categorical fit score of the categorical parameter.

In one embodiment, the reconciliation further includes: computing a sub-categorical fit score for each of the sub-categorical parameter of the antecedent context nexus and the follow-on sub-categorical parameter of the follow-on query, wherein: the sub-categorical fit score of the sub-sub-categorical parameter comprises a dot product between embeddings of the sub-categorical parameter and embeddings of the follow-on query, the sub-categorical fit score of the follow-on sub-categorical parameter comprises a dot product between embeddings of the follow-on sub-categorical parameter and embeddings of the follow-on query, and the reconciliation includes updating the antecedent context nexus by replacing the sub-categorical parameter with the follow-on sub-categorical parameter if the sub-categorical fit score of the follow-on sub-categorical parameter is greater than the sub-categorical fit score of the sub-categorical parameter.

In one embodiment, the method includes contemporaneous with the reconciliation, computing a first response candidate to the follow-on query based on the follow-on categorical parameter and the follow-on sub-categorical parameter for the follow-on query; and computing a second response candidate to the follow-on query based on an update to antecedent context nexus based on the follow-on categorical parameter and the follow-on sub-categorical parameter for the follow-on query.

In one embodiment, the method includes computing a first confidence score for the first response candidate for responding to the follow-on query; computing a second confidence score for the second response candidate for responding to the follow-on query, constructing a response to the follow-on query based on selecting the second response candidate if the second confidence score is greater than the first confidence score; or constructing a follow-on response to the follow-on query based on selecting the first response candidate if the first confidence score is greater than the second confidence score; and returning, via the user interface, follow-on the response to the follow-on query.

In one embodiment, a confidence score relates to a value indicating a degree of confidence or a probability value that a target response candidate satisfies an intent of a target query.

In one embodiment, performing the context nexus-informed search of the corpus of structured data includes: identifying a first subset of response candidates of the corpus of structured data having a first classification label that matches the categorical parameter of the antecedent context nexus; and identifying a second subset of response candidates from the first subset of response candidates having a second classification label that matches the sub-categorical parameter of the antecedent context nexus.

In one embodiment, computing the context nexus includes: generating, via an embeddings model, embeddings of the preceding query based on text data of the preceding query; selecting, from a corpus of categorical parameter values, a value of the categorical parameter of the context nexus based on the embeddings; and selecting, from the corpus of categorical parameter values, a value of the sub-categorical parameter of the content nexus based on the embeddings, wherein the value of the categorical parameter is distinct from the value of the sub-categorical parameter.

In one embodiment, computing the context nexus includes: generating, via an embeddings model, embeddings of the preceding query based on text data of the preceding query; computationally mapping the embeddings of the preceding query to an n-dimensional embeddings space comprising a plurality of distinct embedding values for the plurality of distinct categories of the corpus of structured data and a plurality of distinct embedding values for the plurality of distinct sub-categories of the structure corpus of data.

In one embodiment, computing the context nexus further includes: identifying a region of intersection between categorical embeddings associated with a distinct category of the plurality of distinct categories and sub-categorical embeddings associated with a distinct sub-category of the plurality of distinct sub-categories based on the mapping; setting a value of the categorical parameter based on a classification label associated with the distinct category; and setting a value of the sub-categorical parameter based on a classification label associated with the distinct sub-category.

In one embodiment, a system for improving a predictive accuracy of a machine learning-based virtual conversational agent includes a machine learning module implementing one or more unsupervised machine learning models that compute parameter values for an antecedent context nexus based on query embeddings computed for a preceding query input by a user, wherein the antecedent context nexus includes a pairing of a categorial parameter and a sub-categorical parameter derived based on the query embeddings of the preceding query; a database storing a corpus of structured data; a response discovery module, implemented by one or more computers, that: creates search logic parameters based on the categorical parameter and the sub-categorical parameter of the antecedent context nexus; executes a context nexus-informed search of a corpus of structured data using at least the search logic parameters; extracts a response candidate from the corpus of structured data based on the execution of the context nexus-informed search; constructs a response to the preceding query based on the extracted response candidate; and returns, via a user interface associated with a computing device, the response to the preceding query.

In one embodiment, the query embeddings computed for the preceding query comprise sentence embeddings based on a span of a plurality of tokens identified within the preceding query; and computing the antecedent context nexus includes using the sentence embeddings derived for the preceding query to perform a search of an n-dimensional embeddings space comprising a plurality of distinct embedding values for the plurality of distinct categories of the corpus of structured data and a plurality of distinct embedding values for the plurality of distinct sub-categories of the structure corpus of data.

In one embodiment, the categorical parameter comprises word or category label embeddings representing a likely top-level category of the preceding query, the sub-categorical parameter comprises word or category label embeddings representing a likely sub-level category of the preceding query, and executing the context nexus-informed search of the corpus of structured data includes: searching an n-dimensional space of distinct word or category label embeddings for each distinct piece or distinct set of structured data of the corpus of structured data based on computationally mapping the word or category label embeddings of the top-level category and the word or category label embeddings of the sub-level category to one or more regions of embeddings of the n-dimensional space.

In one embodiment, the system includes a context arbitration module implemented by one or more processors that: receives a follow-on categorical parameter and a follow-on sub-categorical parameter based on embeddings computed for a follow-on query that is input by the user; and reconciles the antecedent context nexus with the follow-on categorical parameter and the follow-on sub-categorical parameter for the follow-on query, wherein the reconciliation includes: computing whether to update the categorical parameter of the antecedent context nexus with the follow-on categorical parameter; and computing whether to update the sub-categorical parameter of the antecedent context nexus with the follow-on sub-categorical parameter.

In one embodiment, contemporaneous with the reconciliation, the response discovery module further: computes a first response candidate to the follow-on query based on the follow-on categorical parameter and the follow-on sub-categorical parameter for the follow-on query; and computes a second response candidate to the follow-on query based on an update to antecedent context nexus based on the follow-on categorical parameter and the follow-on sub-categorical parameter for the follow-on query.

In one embodiment, the response discovery module further: computes a first confidence score for the first response candidate for responding to the follow-on query; computes a second confidence score for the second response candidate for responding to the follow-on query, constructs a response to the follow-on query based on selecting the second response candidate if the second confidence score is greater than the first confidence score; or constructs a follow-on response to the follow-on query based on selecting the first response candidate if the first confidence score is greater than the second confidence score; and returns, via the user interface, follow-on the response to the follow-on query.

BRIEF DESCRIPTION OF THE FIGURES

FIG. 2 illustrates an example method 200 in accordance with one or more embodiments of the present application.

DESCRIPTION OF THE PREFERRED EMBODIMENTS

The following description of the preferred embodiments of the invention is not intended to limit the invention to these preferred embodiments, but rather to enable any person skilled in the art to make and use this invention.

Figure 1:
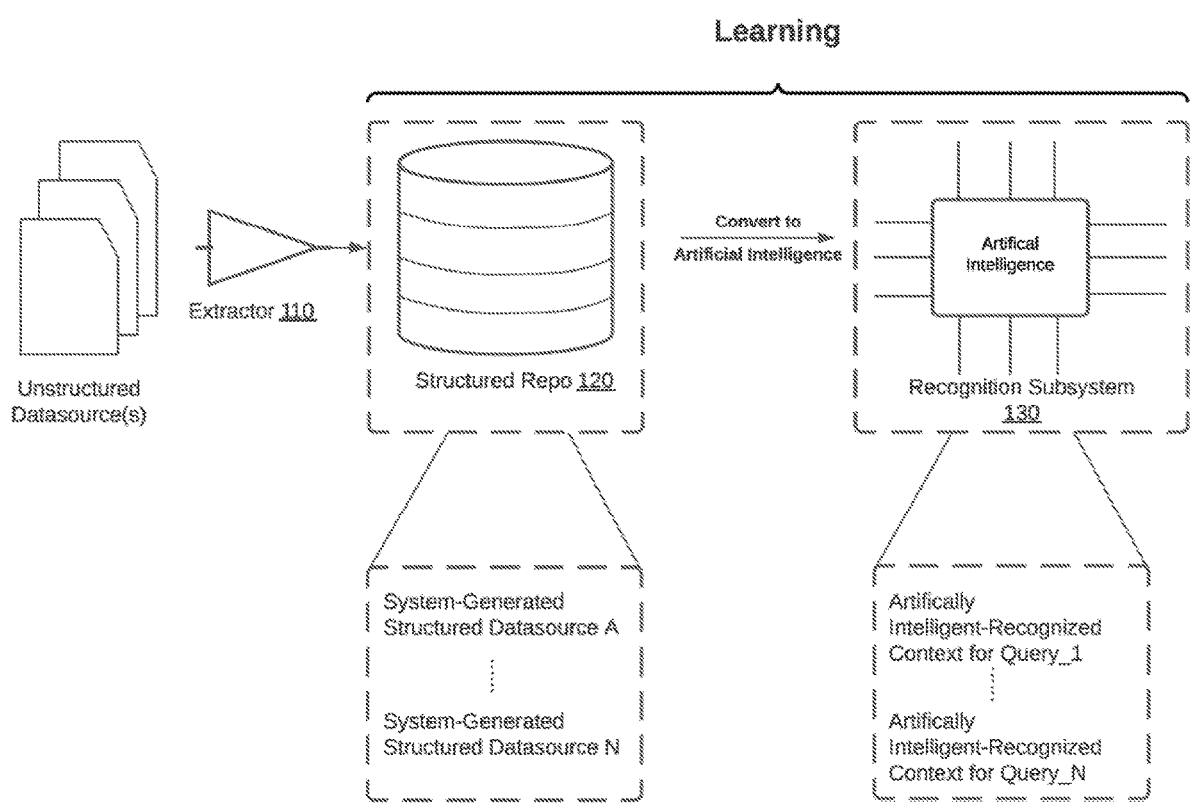
FIG. 1 illustrates a schematic representation of a system 100 in accordance with one or more embodiments of the present application.

1. System for Machine Learning-Based Context Identification, Query Handling and Automatic Response Generation As shown in FIG. 1, a system 100 that may be configured to implement an automated query handling using machine learning-based contextual parameters includes a structure extractor 110, a structured query response repository 120, and a context recognition response subsystem 130.

In one or more embodiments, the structure extractor no may be configured to identify and extract unstructured data from one or more sources of data and convert the unstructured data to one or more recognized structured data formats of the structured query response repository 120. In such embodiments, the structure extractor no may be in operable communication, via the Internet or the like, with one or more sources of unstructured data and similarly, in operable communication with one or more structured repositories of the system 100.

Additionally, or alternatively, the structure extractor no may function to implement one or more machine learning models including unsupervised machine learning models, such as a transformer model, for converting the unstructured data to vector representations mapped to an n-dimensional space. In one or more embodiments, the structure extractor may additionally identify and/or discover categories or topics of queries and responses based on an application of one or more machine learning-based clustering techniques. In such embodiments, the structure extractor 110 may function to apply contextual tags or labels based on the resulting clustering or grouping of the structured data.

The structured query response repository 120 may be configured to store formerly unstructured data from one or more sources of data in a structured format that may be suitable for intelligent querying applications. In one or more embodiments, the structured data may be stored in one or more of pre-defined hierarchies and/or tables. Additionally, or alternatively, the structured query response repository 120 may function to store contextual labels or tags, as metadata, in association with each structured response item. It shall be recognized that the structured query response repository 120 may function to implement any suitable data structure for organizing, structuring, and/or storing data.

Figure 3:
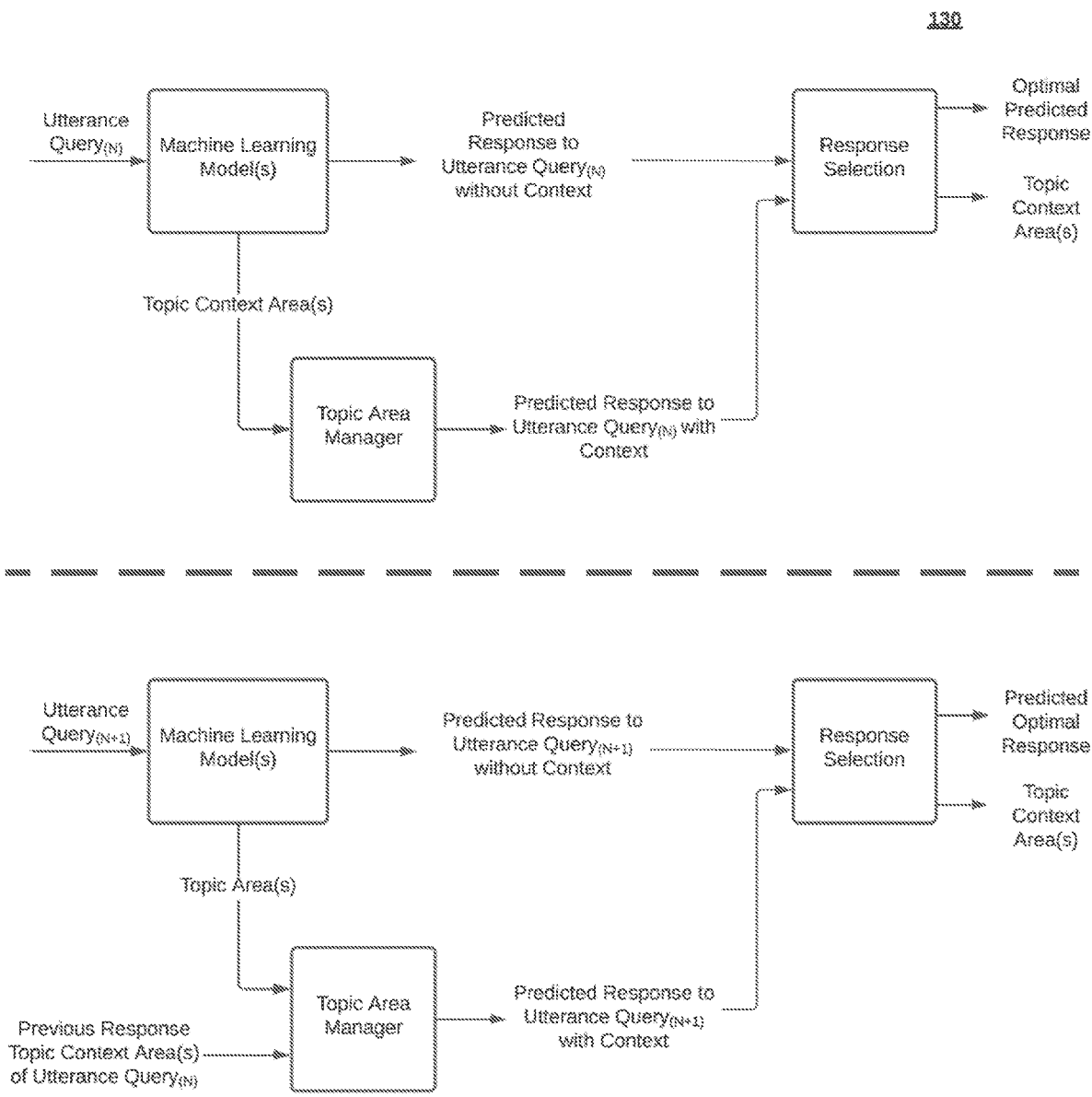
FIG. 3 illustrates an example mixed process flow and block diagram of a subsystem of system 100 in accordance with one or more embodiments of the present application.

In one or more embodiments, the context recognition response subsystem 130 may include a plurality of distinct query handling routes configured to handle a target query in either a contextless manner or in a manner with previous context (e.g., antecedent context), as illustrated by way of example in FIG. 3.

Additionally, or alternatively, the context recognition response subsystem 130 may implement one or more ensembles of pre-trained or trained machine learning models. The one or more ensembles of machine learning models may employ any suitable machine learning including one or more of: supervised learning (e.g., using logistic regression, using back propagation neural networks, using random forests, decision trees, etc.), unsupervised learning (e.g., using an Apriori algorithm, using K-means clustering), semi-supervised learning, reinforcement learning (e.g., using a Q-learning algorithm, using temporal difference learning), adversarial learning, and any other suitable learning style. Each module of the plurality can implement any one or more of: a regression algorithm (e.g., ordinary least squares, logistic regression, stepwise regression, multivariate adaptive regression splines, locally estimated scatterplot smoothing, etc.), an instance-based method (e.g., k-nearest neighbor, learning vector quantization, self-organizing map, etc.), a regularization method (e.g., ridge regression, least absolute shrinkage and selection operator, elastic net, etc.), a decision tree learning method (e.g., classification and regression tree, iterative dichotomiser 3, C4.5, chi-squared automatic interaction detection, decision stump, random forest, multivariate adaptive regression splines, gradient boosting machines, etc.), a Bayesian method (e.g., naïve Bayes, averaged one-dependence estimators, Bayesian belief network, etc.), a kernel method (e.g., a support vector machine, a radial basis function, a linear discriminate analysis, etc.), a clustering method (e.g., k-means clustering, density-based spatial clustering of applications with noise (DBSCAN), expectation maximization, etc.), a bidirectional encoder representation form transformers (BERT) for masked language model tasks and next sentence prediction tasks and the like, variations of BERT (i.e., ULMFiT, XLM UDify, MT-DNN, SpanBERT, RoBERTa, XLNet, ERNIE, KnowBERT, VideoBERT, ERNIE BERT-wwm, Mobile-BERT, TinyBERT, GPT, GPT-2, GPT-3, GPT-4, ChatGPT (and all subsequent iterations), ELMo, content2Vec, and the like), an associated rule learning algorithm (e.g., an Apriori algorithm, an Eclat algorithm, etc.), an artificial neural network model (e.g., a Perceptron method, a back-propagation method, a Hopfield network method, a self-organizing map method, a learning vector quantization method, etc.), a deep learning algorithm (e.g., a restricted Boltzmann machine, a deep belief network method, a convolution network method, a stacked auto-encoder method, etc.), a dimensionality reduction method (e.g., principal component analysis, partial lest squares regression, Sammon mapping, multidimensional scaling, projection pursuit, etc.), an ensemble method (e.g., boosting, bootstrapped aggregation, AdaBoost, stacked generalization, gradient boosting machine method, random forest method, etc.), and any suitable form of machine learning algorithm. Each processing portion of the system 100 can additionally or alternatively leverage: a probabilistic module, heuristic module, deterministic module, or any other suitable module leveraging any other suitable computation method, machine learning method or combination thereof. However, any suitable machine learning approach can otherwise be incorporated in the system 100. Further, any suitable model (e.g., machine learning, non-machine learning, etc.) may be implemented in the various systems and/or methods described herein.

In some embodiments, method 200 may implement one or more machine learning models of the context recognition response subsystem 130 for processing queries and responses including, but not limited to, a large language model, a contextual model, a slot extraction model, and a transactional model. In an embodiment, the large language model may be any suitable language model for initially processing a user query or utterance, as described in detail in S210. In an embodiment, the contextual model may be a language model tuned for contextual behavior based on the context nexus and contextual parameters, as described in detail in S220. In an embodiment, the slot extraction model may be an unsupervised model for identifying and extracting slot values from user queries and/or utterances in a transactional user interaction, whereby the slot extraction model may match extracted slot values with slots (i.e., parameters) of the transactional interaction in a slot-filling process. In an embodiment, the transactional model may be a model for evaluating contextual parameters as well as extracted slots from a transactional user interaction for determining weights given to dynamic data from the transactional interaction when computing contextual parameters.

2. Method for Machine Learning-Based Context Identification, Query Handling and Automatic Response Generation As shown in FIG. 2, a method for machine learning-based context administration for intelligent query response generation includes computing a query or an utterance vector S210, computing a context nexus S220, routing query data S230, reconciling context nexus parameters of an antecedent context nexus S240, and identifying an optimal response to a query S250.

2.10 Computing Query Embeddings

S210, which includes computing a query or an utterance vector, may function to generate a vector representation in response to receiving or identifying a query. That is, in a preferred embodiment, a system implementing the method 200 may function to handle a query (text) string or utterance string input by a user or the like by initially converting the query string to an embedding value (embeddings) or similar numerical vector representation of the query string. In this preferred embodiment, S210 may function to implement an unsupervised machine learning model (e.g., a transformer model, an embeddings model or similar language model) that operates to convert or map the text of a target query string to a vector value in an n-dimensional embeddings/vector space.

In one or more embodiments, computing the query or utterance vectors may include performing parameter extraction and/or slot filling based on an input of the query or utterance. In such embodiments, S210 may function to implement a parameter or slot filling model (e.g., RNNs, LSTM, bi-directional LSTM, and the like) to predict one or more continuous spans of tokens (words, expressions (e.g., emojis) or the like) within a target query and extract the one or more distinct spans of tokens as likely parameter input to an embeddings model. Accordingly, each of the one or more distinct spans of tokens may be converted to embeddings or numerical representations of the spans of tokens, which may preferably be used to predict either or both of a categorical parameter value and a sub-categorical parameter value of a context nexus, as described in more detail below.

In a preferred embodiment, S210 may function to extract from a target query sentence spans and compute query-sentence embeddings based on the sentence spans. In such implementation, computing embeddings on sentence spans or a span of multiple tokens may provide additional context that improves an accuracy of downstream predictions or categorical searches including, but not limited context nexus parameter searches, as described herein. As a non-limiting example, based on an input of a target query of "What about a checking account?", S210 preferably functions to extract and generate embeddings for the span of tokens including "What about a checking account?" rather than simply the token or word "checking". In this example, the additional context of the entire sentence may drive improved accuracy in the search for context nexus parameters (i.e., categorical parameter values and sub-categorical parameter values).

Additionally, or alternatively, in one or more embodiments, S210 may function to implement any suitable sentence or text embedding service or language model that may convert queries or utterances to a numerical-based vector representation. In such embodiments, S210 may function to route a target query via an API or the like to the embedding service for converting the target query to an embedding value.

It shall be recognized that a query may be received via a user interface or the like in any suitable form including, but not limited to, as an utterance (i.e., one or more words spoken aloud) input, text input, gesture input, and/or the like.

In some embodiments, S210 may function to compute embeddings of queries and/or utterances which include jargon (i.e., business or other context-specific terminology) which may be incorrectly computed by a standard language model. In such embodiments, S210 may function to implement a jargon mapping process, which may include directly and/or automatically mapping one or more jargon terms to one or more embedding values or similar numerical vector representations which may correspond to a user-intended and/or actual meaning of the one or more jargon terms. Accordingly, in some embodiments, in a pre-processing step or the like, terms or values of an utterance that may be identified in S210 as being jargon may be initially mapped to non-jargon terms that a standard language model can process with higher accuracy. In such embodiments, while an utterance input may include one or more jargon terms or values, S210 may function to substitute each of the one or more jargon terms with a non-jargon equivalent and provide the modified utterance with having the non-jargon equivalents or substitutes as input to the standard language model or the like.

2.20 Generating Context Nexus Parameters for a Query

S220, which includes computing a context nexus, may function to identify and/or compute context nexus parameter values based on a computed embedding value of a target query or utterance. A context nexus, as referred to herein, preferably relates to a machine learning-derived artifact for a target query that includes one or more contextual parameter values that each relate to a likely query topic area or query category of the target query. In a preferred embodiment, a context nexus may include a first context nexus parameter (e.g., a category context nexus parameter) relating to top-level category or topic of a target query and a second context nexus parameter (e.g., a sub-category context nexus parameter) relating to a low-level or sub-category or sub-topic within or intersecting the top-level category of the target query (e.g., {cat_param, sub-cat_param}). It shall be recognized that a context nexus may be extensible to include additional categorical or sub-categorical parameter values.

Additionally, or alternatively, each context nexus parameter of a context nexus associated with a target query may be represented as a categorical or a sub-categorical tag or label. In such embodiments, each categorical or sub-categorical tag or label may be selected from a contextual corpus of categorical labels applied to a structured corpus of data. Accordingly, in some embodiments, the context nexus parameters of a context nexus may together inform search logic and/or search parameters for identifying a response candidate to a target query based on a search of the structured corpus of response data.

It shall be recognized that, while it may be generally described that a computed context nexus for a given query may include two categorical parameters, a computed context nexus may include more than two context nexus parameter values or a single context nexus parameter value.

In one or more embodiments, computing a context nexus based on a target query includes identifying or computing embeddings of the target query (as described in S210) and computationally mapping the embeddings values of the target query to a multi-dimensional space pre-defined by categorical and sub-categorial clusters of embedding or vector values that each represent distinct query topic areas and query sub-topic areas. That is, in such embodiments, S220 may function to attribute or associate the embedding value of the target query to at least one cluster of embedding values within the multi-dimensional space. In this way, S220 may function to identify at least one top-level category associated with at least one cluster and at least one sub-level category associated with a smaller or overlapping cluster based on the attribution.

In one or more embodiments, the multi-dimensional space may include multiple distinct domains of query wherein each distinct domain may include a collection of embedding values for distinct topic areas or categories of query that exist within the purview of the distinct domain. In some embodiments, each domain may include a plurality of top-level categories each defined by a cluster of semantically-related query embedding values and a plurality of sub-level categories that are each defined by smaller clusters of semantically-related query embedding values. In some embodiments, each cluster and small cluster of the multi-dimensional space may be defined based on identifying a distinct mass of embedding values having a centroid.

Additionally, or alternatively, the n-dimensional space may be derived and/or defined based on attributes of a structured corpus of data. In one or more embodiments, a query handling service implemented the system 100 and/or method 200 may function to construct a corpus of structured data for a given subscriber to the service. In such embodiments, a construction of the corpus of structured data may include sourcing unstructured and/or semi-structured data from various sources of data associated with the subscriber and structuring the data according to a suitable ontology. Additionally, or alternatively, the service may function to each distinct piece of data and/or distinct structured dataset of the corpus of structured data to embeddings and/or vector representations, which may be mapped to and/or define the n-dimensional space. Accordingly, using clustering techniques (e.g., clustering algorithms, unsupervised machine learning models, and/or the like), a plurality of distinct categorical clusters of structured data and a plurality of distinct sub-categorical clusters of structured data may be defined or discovered.

In a preferred embodiment, S220 may function to implement an unsupervised machine learning model to compute a query embedding value based on an input of a target query. In such preferred embodiment, the unsupervised machine learning may function to identify the context parameter values by performing a distinct-based mapping (e.g., cosine distance) or position-based mapping of the embedding value of the target query to a multi-dimensional space. For instance, S220 may function to compute a category context nexus parameter based on calculating a smallest cosine distance value between the embedding value of a target query and one centroid of a given categorical cluster. In yet another embodiment, S220 may function to identify a categorical parameter value and a sub-categorical parameter value based on embeddings of a target query by mapping the embeddings to a region of the multi-dimensional space at which two or more distinct categorical and/or sub-categorical clusters of embeddings intersect. In such embodiments, S220 may function to set the category label of the categorical cluster and the sub-categorical label of the sub-categorical cluster that define the interesting region as the categorical parameter value and the sub-categorical parameter value of the context nexus.

2.30 Query Data Routing and Propagation

S230, which includes routing query data, may function to route query data associated with a target query along one or more query handling routes based at least on context nexus data associated with the target query. In one or more embodiments, a system implementing the method 200 may include multiple distinct query handling routes or query data processing pipelines that may each function to evaluate and process data associated with a target query for identifying a most likely or probable response to the target query, as shown by way of example in FIG. 3. In one or more embodiments, each of the plurality of distinct query handling routes may function to propagate query data and the like along a sequence of response computation operations of the route that, when executed, operate on the query data for computing one or more response candidates to the target query.

In one embodiment, the one or more query handling routes include a contextless query handling route that may include a sequence of query handling operations for identifying a response candidate for target query without performing a context nexus update based on historical or prior query context nexus data. In such embodiment, the contextless query handling route may function to negotiate and/or identify an optimal response candidate based on a response search formulated using the context nexus of the target query.

In one embodiment, the one or more query handling routes include an antecedent context-informed query handling route that may include a sequence of query handling operations for identifying a response candidate for a target query based on an antecedent context nexus of a prior query and a current context nexus of the target query, as described in more detail in S240.

Accordingly, in a first implementation, S230 may function to route query data of a target query to the contextless query handling route by default such that all identified queries may be evaluated via the contextless route. In a variation of this first implementation, S230 may function to route query data to the contextless query handling route when or if S230 identifies the target query as a single or independent query or a first query of a sequence of queries of a querying session. A querying session, as referred to herein, preferably relates to a period in which one or more queries may be posed to query system or query service implementing the method 200.

In a second implementation, S230 may function to route query data associated with a target query to both of the contextless query handling route and the antecedent context query handling route based on identifying an antecedent context nexus of a previous query along with context nexus of a target query. That is, in this second implementation, multiple queries may be posed during a querying session in which distinct context nexuses are computed for each of the multiple queries during the querying session. Accordingly, in one or more embodiments, historical or antecedent context nexuses may be provided as input together with a context nexus of the target query into the antecedent context nexus query handling route for computing an optimal response candidate. In some embodiments, target query data, context nexus data, and/or antecedent context nexus data may be provided as input to each of the plurality of distinct query handling routes including, but not limited to, in a sequential manner, simultaneously (for simultaneous computes of response candidates), and/or the like.

2.40 Antecedent Context Nexus|Context Nexus Update-|Context Arbiter

S240, which includes reconciling context nexus parameters of an antecedent context nexus, may function to reconcile an antecedent context nexus associated with a historical or preceding query with a context nexus of a target or follow-on query. Preferably, in one or more embodiments, each of the antecedent context nexus of the historical query and the context nexus of the target query may be computed during a querying session. In such embodiments, the historical query may have preceded the target query in time and/or sequence such that the historical query may have been posed and handled by at least one of the plurality of distinct query handling routes before the target query.

In one or more embodiments, reconciling (e.g., a reconciliation operation) context nexus parameters may include updating and/or replacing one or more of the context nexus parameter values of the antecedent context nexus with one or more of the context nexus parameter values of the context nexus of the target query based on identifying a difference in the parameter values of the context nexus of the target query relative to the parameter values of the antecedent context nexus. Accordingly, a reconciliation operation, as referred to herein, preferably relates to a parameter augmentation, a parameter swap, a parameter replacement, a parameter deletion, and/or the like performed on one or more of an antecedent context nexus and a context nexus based on identifying context or context data of one or more target queries, which in some embodiments is performed by a context arbitration module or sub-component of the context recognition response subsystem 130.

In such embodiments, S240 may function to implement one more context nexus arbitration modules or the like (e.g., context arbiter) that evaluates the difference between the parameter values of the antecedent context nexus and the content nexus of the target query and updates, by replacing or supplanting, either the categorical nexus parameter and/or the sub-categorical nexus parameter value of the antecedent context nexus with the different or newly computed categorical and/or sub-categorical nexus parameter values of the context nexus of the target query.

Accordingly, in such embodiments, if the categorical parameter value of the context nexus of the target query is new or different than that of the antecedent context nexus, S240 may function to swap or replace the categorical parameter value of the antecedent context nexus with the categorical parameter value of the context nexus of the target query. S240 may function to perform a similar reconciliation between parameter values of the sub-categorical parameter of the antecedent context nexus and the context nexus of the target query if there is a difference or when the sub-categorical parameter value is new.

In a preferred embodiment, S240 may function to perform a reconciliation of context nexus parameters of an antecedent context nexus and a context nexus of a target query based on a context relationship matrix. In one or more embodiments, the context relationship matrix may include a plurality of paired context archetypes having a predefined relationship that informs a type of reconciliation operation to be executed for reconciling context parameter values of a context nexus and an antecedent context nexus. In such embodiments, each distinct context archetype may define a distinct contextual relationship between at least two categorical nexus parameters or at least two sub-categorical nexus parameters that may be mapped to a distinct reconciliation operation. In this way, if a pairing of two categorical or sub-categorical context nexus parameters satisfies a given context archetype during a reconciliation, S240 may function to automatically execute the distinct reconciliation operation associated with the given context archetype.

As a non-limiting example, the contextual relationship matrix may include a plurality of distinct contextual archetypes including, but not limited to, a mutually exclusive archetype, an irrelevant information archetype, a subset/superset archetype, a required information archetype and/or the like. In such non-limiting example, a satisfaction of the conditions or criteria of the mutually exclusive archetype may automatically cause a swap between pair of context nexus parameters of an antecedent context nexus and of a context nexus. That is, a new context parameter value of a context nexus may function to replace, in a swap, a context parameter value of the antecedent context nexus. Additionally, or alternatively, the irrelevant information archetype may cause a deletion of a context nexus parameter, such as a deletion of a sub-categorical context nexus parameter, when it is identified that the context nexus parameter being targeted for deletion is not relevant or otherwise, does not have a contextual connection to or response discovery function with respect to a primary context nexus parameter, such as a categorical context nexus parameter. In one or more embodiments, the subset/superset context archetype, when satisfied based on an evaluation of context parameter values, may include augmenting or adding a categorical (or parent) context nexus parameter or a sub-categorical context nexus parameter to a context nexus. In such embodiments, the subset/superset archetype recognizes and/or defines context parameter relationships in which a second context parameter value may be within the purview of a first context parameter (e.g., a subset category of a first category). Similarly, in some embodiments, when two categories are likely to coexist or may not be mutually exclusive, a satisfaction of the superset archetype may function to augment the context nexus with a missing context nexus parameter value that forms a coexistent pair with an existing context nexus parameter value of a context nexus. Additionally, or alternatively, the required information archetype may define a contextual relationship between distinct pairs of context parameter values, such that a presence of a first context parameter value in a target context automatically triggers a requirement for a second context parameter value. In such embodiments, the second context parameter value may be considered indispensable for completing an intent of a target query and therefore, added together with the first context nexus parameter into a target context nexus.

It shall be recognized that, while the several above-enumerated context archetypes may define part of the context relationship matrix, the context relationship matrix may be extensible to various and/or any type of context archetypes, which may be used to inform any suitable reconciliation operation involving context nexus parameter values of a target context nexus.

It shall be recognized that, in some embodiments, the reconciliation of differing parameter values of the antecedent context nexus and the context nexus may include augmenting the new parameter values to the antecedent context nexus rather than replacing any of the previous or different parameter values. In this way, either the categorical or the sub-categorical slot of the antecedent context nexus may include multiple parameter values. Alternatively, S240 may function to augment the antecedent context nexus with an additional slot for storing or receiving a new or a different parameter value from the context nexus of the target query (e.g., {param_1, param_2, new_param}).

Additionally, or alternatively, in some embodiments, reconciling context nexus parameters may include maintaining the context nexus parameter values of the antecedent context nexus if or when parameter values of a context nexus of a target query may be unchanged.

2.50 Optimal Response Generation

S250, which includes returning an optimal response, may function to generate response search parameters, evaluate response candidates of the plurality of distinct query handling routes, and identify a most likely response (e.g., an optimal response) to a target query or a chain of target queries.

Response Search Parameter Generation

In one or more embodiments, S250 may function to generate response search parameters and/or search logic based on context nexus data. That is, S250 may function to generate search parameters by using context parameter values as part of a query to a structured query response repository (e.g., repository 120). In such embodiments, the context nexus parameters derived for and/or through each of the plurality of distinct query handling routes may be used to inform or define query search string or similar search criteria.

In one or more embodiments, S250 may function to derive a categorical search parameter based on a categorical context parameter value and a sub-categorical search parameter based on a sub-categorical context parameter value. Additionally, or alternatively, S250 may function to derive a search sequence based on an ordering or positioning of the parameter values within a context nexus. For instance, in a non-limiting example, a categorical context parameter value and sub-categorical context parameter value may appear in a sequence within a context nexus such that the categorical context parameter appears before the sub-categorical context parameter. In this non-limiting example, S250 may function to generate search logic parameters based on the sequence of the context nexus thereby enabling a performance of a query response in which a search parameter component based on the categorical context parameter may be executed or performed ahead of search parameter component based on the sub-categorical context parameter. In some embodiments, a technical advantage of a sequencing of the search logic parameters enables a proper identification of a likely or relevant categorical cluster of embeddings of the corpus of structured data before a further search within the categorical cluster is performed using the sub-categorical search parameters.

It shall be recognized that S250 may function to construct and/or generate response search parameters using any suitable or recognized search expressions (e.g., Boolean expression or operators, etc.) or search technique in combination with the context parameter values of a given context parameter.

Search of N-Dimensional Response Space

Accordingly, in one or more embodiments, in response to the derivation of response search parameters, S250 may function to use the response search parameters to perform one or more searches of a structured search space. In one or more embodiments, the structured search space may include one or more corpora of response items that may be organized into data structures and/or each labeled or tagged with pre-defined categories or topic areas. Additionally, or alternatively, in some embodiments, each response item of the one or more corpora of response items may be associated with a corresponding vector representation or embedding value that may enable a mapping of each response item to an n-dimensional response space.

In some embodiments, the one or more corpora of response items may include augmenting data and/or metadata. As referred to herein, augmenting data and/or metadata preferably relate to data and/or metadata which may be incorporated into the one or more corpora of response items for facilitating the identification of optimal responses. In some embodiments, augmenting data and/or metadata may be based on debugging query-response pairs of previous iterations of the method 200.

In one implementation, S250 may function to perform a query search of the structured search space that includes identifying one or more response items within the structured search space having descriptive labels or tags matching at least the context parameter values of a context nexus. In such implementation, S250 may function to produce one or more of a discovered document, a file, textual response data, and/or the like that have been identified as matching the search parameters or logic of the query search.

Accordingly, S250 may function to perform a search based on each of the distinct query search parameters of the plurality of distinct query handling routes and return at least one optimal response candidate for each route.

Response Score Generation and Optimal Response Identification

Additionally, or alternatively, S250 implementing a search discovery module or sub-component of the context recognition response subsystem 130 may function to compute a response score for each response candidate identified or returned based on the query response searches performed for each of the query handling routes. A response score, as referred to herein, preferably relates to a value indicating a degree of confidence or a probability that a target response candidate satisfies an intent of a target query.

In one embodiment, each query handling route may function to generate a response score based on one or more of query data, data associated with a returned response candidate, and context nexus parameter values associated with each response candidate. In some embodiments, S250 may function to implement a response scoring model that may be trained to predict a response score for each response candidate on the basis of features associated with one or more of query data, data associated with a returned response candidate, and context nexus parameter values associated with each response candidate.

Additionally, or alternatively, in some embodiments, a magnitude of a given response score may be influenced by a length of an unbroken query chain handled via the antecedent query handling route, such that, a response score computation for a plurality of related queries having successful context nexus updates may cause an accrual in the response score for each query in the sequence that may be subsequent of an initial query in the query chain. That is, if a subsequent query in the query chain is sufficiently related to the previous query in the query chain and a successful update of the antecedent context nexus is completed, the response scoring model may predict an increased response scoring value relative to a predicted scoring value produced for a query identical to the subsequent query but that is being handled via the contextless query handling route. In such embodiments, each successful context nexus update of the context nexus for each distinct query in a query chain may increase a likelihood that the context parameter values are optimized for identifying a response candidate having a greater likelihood or probability of satisfying an intent of a target query.

Additionally, or alternatively, S250 may function to identify an optimal response based on evaluating the response score for each of the response candidates of the contextless query handling route and the antecedent context query handling route. In a preferred embodiment, S250 may function to construct an optimal response by integrating the selected response candidate having the highest response score into a predetermined response template associated with one or more of the categorical parameter value and the sub-categorical parameter value of the context nexus. Additionally, or alternatively, S250 may function to return or output the corresponding context nexus parameter values as metadata for potentially performing a subsequent query response search for a given querying session or the like.

3. Computer-Implemented Method and Computer Program Product

Embodiments of the system and/or method can include every combination and permutation of the various system components and the various method processes, wherein one or more instances of the method and/or processes described herein can be performed asynchronously (e.g., sequentially), concurrently (e.g., in parallel), or in any other suitable order by and/or using one or more instances of the systems, elements, and/or entities described herein.

Although omitted for conciseness, the preferred embodiments may include every combination and permutation of the implementations of the systems and methods described herein.

As a person skilled in the art will recognize from the previous detailed description and from the figures and claims, modifications and changes can be made to the preferred embodiments of the invention without departing from the scope of this invention defined in the following claims.

I claim:

1. A computer-implemented method for improving a predictive accuracy of a machine learning-based system executing searches of a structured computer database, the method comprising:
   computing, by one or more processors of a context recognition system executing a pre-trained machine learning model, an antecedent context nexus based on an input of query embeddings vector of a preceding query input of a user, the computing by the one or more processors of the context recognition system includes:
   (i) generating, based on a prediction by the pre-trained machine learning model, a categorical parameter label identifying a top-level category of the preceding query based on the input of the query embeddings vector;
   (ii) generating, based on a prediction by the pre-trained machine learning model, a sub-categorical parameter label identifying a low-level category within a relationship purview of the top-level category or a category intersecting with the top-level category of the preceding query based on the input of the query embeddings vector;
   (iii) generating, by the one or more processors, the antecedent context nexus by forming a search pairing of labels between the categorical parameter label and the sub-categorical parameter label;
   using the categorical parameter label and the sub-categorical parameter label of the search pairing of labels as inputs to create, by the one or more processors, structured computer database search logic parameters for contextually searching a structured computer database storing a corpus of structured data;
   in response to executing, by the one or more processors, the structured computer database search logic parameters, using a combination of (a) the preceding query input of the user and (b) the search pairing of labels to contextually search the corpus of structured data of the structured computer database, wherein the contextual search includes matching both of the categorical parameter label and the sub-categorical Parameter label of the search pairing of labels to descriptive digital labels of one or more digital response items of the structured computer database;
   extracting, by the one or more processors, a response candidate from the one or more digital response items having the descriptive digital labels matching the search pairing of labels based on the execution of the structured computer database search logic parameters;
   using, by the one or more processors, the response candidate to construct a contextually-informed response to the preceding query; and
   returning, via a user interface of a computing device, the contextually-informed response to the preceding query.

2. The computer-implemented method according to claim 1, wherein:
   the query embeddings computed for the preceding query comprise sentence embeddings based on a span of a plurality of tokens identified within the preceding query; and computing the antecedent context nexus includes using the sentence embeddings derived for the preceding query to perform a search of an n-dimensional embeddings space comprising a plurality of distinct embedding values for the plurality of distinct categories of the corpus of structured data and a plurality of distinct embedding values for the plurality of distinct sub-categories of the structure corpus of data.

3. The computer-implemented method according to claim 1, wherein:

the categorical parameter label is derived based on word embeddings representing a likely top-level category of the preceding query, the sub-categorical parameter label is derived based on word embeddings representing a likely sub-level category of the preceding query, and executing the context nexus-informed search of the corpus of structured data includes:

searching an n-dimensional space of distinct word embeddings for each distinct piece or distinct set of structured data of the corpus of structured data based on computationally mapping the word embeddings of the top-level category and the word embeddings of the sub-level category to one or more regions of embeddings of the n-dimensional space.

4. The computer-implemented method according to claim 1, further comprising:

computing a follow-on context nexus based on an input of a follow-on query by the user and the antecedent context nexus of the preceding query, wherein computing the follow-on context nexus includes:

computing a follow-on categorical parameter label for the follow-on query, computing a follow-on sub-categorical parameter label for the follow-on query; and converting the antecedent context nexus to the follow-on context nexus by replacing the categorical parameter label of the antecedent context nexus with the follow-on categorical parameter label of the follow-on context nexus or replacing the sub-categorical parameter label of the antecedent context nexus with the follow-on sub-categorical parameter label.

5. The computer-implemented method according to claim 1, further comprising:

computing a follow-on categorical parameter label and a follow-on sub-categorical parameter label based on embeddings computed for a follow-on query that is input by the user, wherein the follow-on query is a query that is presented to the machine learning-based system by the user after the preceding query input; and reconciling the antecedent context nexus with the follow-on categorical parameter label and the follow-on sub-categorical parameter label for the follow-on query, wherein the reconciliation includes:

computing, by the one or more processors, whether to update the categorical parameter label of the antecedent context nexus with the follow-on categorical parameter label; and computing, by the one or more processors, whether to update the sub-categorical parameter label of the antecedent context nexus with the follow-on sub-categorical parameter label.

6. The computer-implemented method according to claim 5, wherein the reconciliation further includes:

computing a categorical fit score for each of the categorical parameter label of the antecedent context nexus and the follow-on categorical parameter label of the follow-on query, wherein:

the categorical fit score of the categorical parameter label comprises a dot product between embeddings of the categorical parameter label and embeddings of the follow-on query, the categorical fit score of the follow-on categorical parameter label comprises a dot product between embeddings of the follow-on categorical parameter label and embeddings of the follow-on query, and the reconciliation includes updating the antecedent context nexus by replacing the categorical parameter label with the follow-on categorical parameter label if the categorical fit score of the follow-on categorical parameter label is greater than the categorical fit score of the categorical parameter label.

7. The computer-implemented method according to claim 5, wherein the reconciliation further includes:

computing a sub-categorical fit score for each of the sub-categorical parameter label of the antecedent context nexus and the follow-on sub-categorical parameter label of the follow-on query, wherein:

the sub-categorical fit score of the sub-sub-categorical parameter label comprises a dot product between embeddings of the sub-categorical parameter label and embeddings of the follow-on query, the sub-categorical fit score of the follow-on sub-categorical parameter label comprises a dot product between embeddings of the follow-on sub-categorical parameter label and embeddings of the follow-on query, and the reconciliation includes updating the antecedent context nexus by replacing the sub-categorical parameter label with the follow-on sub-categorical parameter label if the sub-categorical fit score of the follow-on sub-categorical parameter label is greater than the sub-categorical fit score of the sub-categorical parameter label.

8. The computer-implemented method according to claim 5, further comprising:

contemporaneous with the reconciliation, computing a first response candidate to the follow-on query based on the follow-on categorical parameter label and the follow-on sub-categorical parameter label for the follow-on query; and computing a second response candidate to the follow-on query based on an update to antecedent context nexus based on the follow-on categorical parameter label and the follow-on sub-categorical parameter label for the follow-on query.

9. The computer-implemented method according to claim 8, further comprising:

computing a first confidence score for the first response candidate for responding to the follow-on query;

computing a second confidence score for the second response candidate for responding to the follow-on query, constructing a response to the follow-on query based on selecting the second response candidate if the second confidence score is greater than the first confidence score;

or constructing a follow-on response to the follow-on query based on selecting the first response candidate if the first confidence score is greater than the second confidence score; and returning, via the user interface, the follow-on response to the follow-on query.

10. The computer-implemented method according to claim 9, wherein a confidence score relates to a value indicating a degree of confidence or a probability value that a target response candidate satisfies an intent of a target query.

11. The computer-implemented method according to claim 1, wherein performing the context nexus-informed search of the corpus of structured data includes:

identifying a first subset of response candidates of the corpus of structured data having a first classification label that matches the categorical parameter label of the antecedent context nexus; and identifying a second subset of response candidates from the first subset of response candidates having a second classification label that matches the sub-categorical parameter label of the antecedent context nexus.

12. The computer-implemented method according to claim 1, wherein computing the context nexus includes:

generating, via an embeddings model, embeddings of the preceding query based on text data of the preceding query;

selecting, from a corpus of categorical parameter labels, the categorical parameter label of the context nexus based on the embeddings; and selecting, from the corpus of categorical parameter labels, the sub-categorical parameter label of the content nexus based on the embeddings, wherein the value of the categorical parameter label is distinct from the value of the sub-categorical parameter label.

13. The computer-implemented method according to claim 1, wherein computing the context nexus includes:

generating, via an embeddings model, sentence embeddings of the preceding query based on text data of the preceding query;

computationally mapping the sentence embeddings of the preceding query to an n-dimensional embeddings space comprising a plurality of distinct embedding values for the plurality of distinct categories of the corpus of structured data and a plurality of distinct embedding values for the plurality of distinct sub-categories of the structure corpus of data.

14. The computer-implemented method according to claim 13, wherein computing the context nexus further includes:

identifying a region of intersection between categorical embeddings associated with a distinct category of the plurality of distinct categories and sub-categorical embeddings associated with a distinct sub-category of the plurality of distinct sub-categories based on the mapping;

setting the categorical parameter label based on a classification label associated with the distinct category; and setting the sub-categorical parameter label based on a classification label associated with the distinct sub-category.

15. A computer-implemented system for improving a predictive accuracy of a machine learning-based system executing searches of a structured computer database, the system comprising:

a machine learning module implementing one or more unsupervised machine learning models that compute, using one or more computer processors, parameter values for an antecedent context nexus based on query embeddings computed for a preceding query input by a user, wherein a computation by the one or more computer processors of the antecedent context nexus includes:

(i) generating, based on a prediction by the one or more unsupervised machine learning models a prediction of a categorical parameter label identifying a top-level category of the preceding query based on the input of the query embeddings vector;

(ii) generating, based on a prediction by the one or more unsupervised machine learning models a prediction of a sub-categorical parameter label identifying a low-level category within a relationship purview of the top-level category or a category intersecting with the top-level category of the preceding query based on the input of the query embeddings vector;

(iii) generating, by the one or more computer processors, the antecedent context nexus by forming a search pairing of labels between the categorical parameter label and the sub-categorical parameter label;

a structured computer database storing a corpus of structured data;

a response discovery module, implemented by the one or more computer processors, that:

uses the categorial parameter label and the sub-categorial parameter label as inputs to create, using the one or more computer processors, structure computer database;

executes, using the one or more processors, the structured computer database search logic parameters, using a combination of (a) the preceding query input of the user and (b) the search pairing of labels to contextually search the corpus of structured data of the structured computer database, wherein the contextual search includes matching both of the categorical parameter label and the sub-categorical parameter label of the search pairing of labels to descriptive digital labels of one or more digital response items of the structured computer database;

extracts, using the one or more computer processors, a response candidate from the one or more digital response items having the descriptive digital labels matching the search pairing of labels;

constructs, using the one or more computer processors, a response to the preceding query based on the extracted response candidate; and returns, via a user interface of a computing device, the response to the preceding query.

16. The computer-implemented system according to claim 15, wherein:

the query embeddings computed for the preceding query comprise sentence embeddings based on a span of a plurality of tokens identified within the preceding query;

computing the antecedent context nexus includes using the sentence embeddings derived for the preceding query to perform a search of an n-dimensional embeddings space comprising a plurality of distinct embedding values for the plurality of distinct categories of the corpus of structured data and a plurality of distinct embedding values for the plurality of distinct sub-categories of the structure corpus of data.

17. The computer-implemented system according to claim 15, wherein:
the categorical parameter label is derived based on sentence embeddings representing a likely top-level category of the preceding query,
the sub-categorical parameter label is derived based on word embeddings representing a likely sub-level category of the preceding query, and
executing the context nexus-informed search of the corpus of structured data includes:
searching an n-dimensional space of distinct word embeddings for each distinct piece or distinct set of structured data of the corpus of structured data based on computationally mapping the word embeddings of the top-level category and the word embeddings of the sub-level category to one or more regions of embeddings of the n-dimensional space.

18. The computer-implemented system according to claim 15, further comprising:
a context arbitration module implemented by one or more processors that:
receives a follow-on categorical parameter label and a follow-on sub-categorical parameter label based on embeddings computed for a follow-on query that is input by the user; and
reconciles the antecedent context nexus with the follow-on categorical parameter label and the follow-on sub-categorical parameter label for the follow-on query, wherein the reconciliation includes:
computing, by the one or more processors, whether to update the categorical parameter label of the antecedent context nexus with the follow-on categorical parameter label; and
computing, by the one or more processors, whether to update the sub-categorical parameter label of the antecedent context nexus with the follow-on sub-categorical parameter label.

19. The system according to claim 18, wherein contemporaneous with the reconciliation, the response discovery module further:
computes a first response candidate to the follow-on query based on the follow-on categorical parameter label and the follow-on sub-categorical parameter label for the follow-on query; and
computes a second response candidate to the follow-on query based on an update to antecedent context nexus based on the follow-on categorical parameter label and the follow-on sub-categorical parameter label for the follow-on query.

20. The computer-implemented system according to claim 19, wherein the response discovery module further:
computes a first confidence score for the first response candidate for responding to the follow-on query;
computes a second confidence score for the second response candidate for responding to the follow-on query,
constructs a response to the follow-on query based on selecting the second response candidate if the second confidence score is greater than the first confidence score;
or
constructs a follow-on response to the follow-on query based on selecting the first response candidate if the first confidence score is greater than the second confidence score; and
returns, via the user interface, follow-on the response to the follow-on query.

* * * * *